US011827348B2

(12) United States Patent
Acikel

(10) Patent No.: US 11,827,348 B2
(45) Date of Patent: Nov. 28, 2023

(54) VTOL TILTING FUSELAGE WINGED FRAME MULTIROTOR AIRCRAFT

(71) Applicant: Gurkan Acikel, Eskisehir (TR)

(72) Inventor: Gurkan Acikel, Eskisehir (TR)

(*) Notice: Subject to any disclaimer, the term of this patent is extended or adjusted under 35 U.S.C. 154(b) by 0 days.

(21) Appl. No.: 17/426,138

(22) PCT Filed: Mar. 21, 2019

(86) PCT No.: PCT/TR2019/050183
§ 371 (c)(1),
(2) Date: Jul. 28, 2021

(87) PCT Pub. No.: WO2020/190223
PCT Pub. Date: Sep. 24, 2020

(65) Prior Publication Data
US 2022/0097840 A1  Mar. 31, 2022

(30) Foreign Application Priority Data

Jan. 25, 2021 (IN) ............................. 202017044436
Mar. 4, 2021 (EP) ................................... 19919693
Mar. 6, 2021 (TR) .............................. 2021/004349

(51) Int. Cl.
*B64C 29/00* (2006.01)
*B64C 1/06* (2006.01)
(Continued)

(52) U.S. Cl.
CPC .......... *B64C 29/0033* (2013.01); *B64C 1/065* (2013.01); *B64C 1/26* (2013.01);
(Continued)

(58) Field of Classification Search
CPC ..................... B64C 29/0033; B64C 29/0075
See application file for complete search history.

(56) References Cited

U.S. PATENT DOCUMENTS 5,115,996 A    5/1992 Moller
5,395,073 A *  3/1995 Rutan .................... B64C 29/02
                                                     244/38
(Continued)

FOREIGN PATENT DOCUMENTS

CN    107244415 A    10/2017
CN    105730676 A     2/2018
(Continued)

OTHER PUBLICATIONS

Cutler, Mark and How, Jonathan P. "Analysis and Control of a Variable-Pitch Quadrotor for Agile Flight." Journal of Dynamic Systems, Measurement, and Control 137, No. 10 (Jul. 2015): 101002. ©2015 American Society of Mechanical Engineers http://dx.doi.org/10.1115/1.4030676.
(Continued)

*Primary Examiner* — Tien Q Dinh
*Assistant Examiner* — William L Gmoser

(57) ABSTRACT

A vertical takeoff and landing aircraft takeoff/land as a multirotor and cruises as an airplane. The aircraft comprises two major parts: a winged carrier frame comprises wings, engines, propellers and landing gears; a tilting fuselage comprises cockpit, cabin and tail. The winged carrier frame is basically an X/H frame multirotor in which its thruster carrying arms are wing shaped. The aircraft can vertical takeoff as a multirotor aircraft after gaining safe altitude and forward airspeed the aircraft changes its flying axis that the wings and the thrust direction parallel to the horizon. The lift generated by the wings and thrust generated by the thrusters that aircraft has basic airplane flying characteristics. The fuselage tilted to keep the crew, passengers and payload relatively parallel to the horizon. The speed is reduced then the winged carrier frame and the tilting fuselage returned to multirotor mode for the landing.

10 Claims, 7 Drawing Sheets

(51) Int. Cl.
  B64C 13/04     (2006.01)
  B64C 1/26      (2006.01)
  B64D 27/02     (2006.01)

(52) U.S. Cl.
  CPC .......... B64C 13/042 (2018.01); B64C 13/044 (2018.01); B64D 2027/026 (2013.01)

(56) References Cited

U.S. PATENT DOCUMENTS

| | | | | |
|---|---|---|---|---|
| 5,863,013 | A * | 1/1999 | Schmittle | ............. B64C 39/04 244/38 |
| 2003/0230671 | A1 | 12/2003 | Dunn | |
| 2016/0144957 | A1 | 5/2016 | Claridge et al. | |
| 2017/0158325 | A1 | 6/2017 | Chen | |
| 2017/0334557 | A1 | 11/2017 | Alber et al. | |
| 2018/0044011 | A1 * | 2/2018 | Reichert | ............. B64C 39/062 |
| 2018/0354615 | A1 * | 12/2018 | Groninga | ............. B64D 27/24 |
| 2019/0291863 | A1 | 9/2019 | Lyasoff et al. | |
| 2020/0070970 | A1 * | 3/2020 | Nilsen | ............. B64C 1/1476 |
| 2022/0048617 | A1 * | 2/2022 | Shima | ............. B64D 27/24 |

FOREIGN PATENT DOCUMENTS

| | | |
|---|---|---|
| CN | 207029551 U | 2/2018 |
| CN | 108639328 A | 10/2018 |

OTHER PUBLICATIONS

Richard B. Bramlette and Ronald M. Barrett. "Design and Flight Testing of a Convertible Quadcopter for Maximum Flight Speed" 55th AIAA Aerospace Sciences Meeting, AIAA SciTech Forum, (AIAA 2017-0243) Grapevine, Texas Jan. 2017.

Mark Johnson Cutler. "Design and Control of an Autonomous Variable-Pitch Quadrotor Helicopter" Master of Science in Aeronautics and Astronautics Massachusetts Institute of Technology 2012.

Shouzhao Sheng * And Chenwu Sun. "Control and Optimization of a Variable-Pitch Quadrotor with Minimum Power Consumption" Energies 2016, 9, 232; doi:10.3390/en9040232 www.mdpi.com/journal/energies.

* cited by examiner ns or propellers. These
VTOL TILTING FUSELAGE WINGED FRAME MULTIROTOR AIRCRAFT

TECHNICAL FIELD

The purpose of this patent application is; design of the novel manned vertical takeoff and landing (VTOL) tilting fuselage winged frame multirotor aircraft that can takeoff, fly and land as a multirotor aircraft; flies at high speed at cruise flight as an airplane.

BACKGROUND ART

The multirotor system aerodynamics are similar with helicopter aerodynamics. Their operating speed is slower than airplanes. There are many studies to design aircraft takeoff and land vertically like the helicopters but fly horizontally like the airplanes. The tilt-rotor, tilt-wing and vectored thrust jets are well known examples. The tilt-rotor have conventional wings and tilted large span propellers powered by turbo-prop engines on wing tip. The idea on these tilt rotor aircraft is rotating propellers and engines while wings and fuselage are stationary. The large span propellers and high power turbo-prop engines are installed to wing tips used for takeoff/land and forward flight. The tilt rotor systems complex and high cost systems that have slower cruise speed than airplanes. Similar technic used on tilt-wing but wings rotated with engines installed rigidly on wings. Another example of the X wing shaped aircraft rotates wings that propeller and engines installed on these X shaped wings. The vectored thrust vertical takeoff and landing fighter aircraft has thrust nozzles placed under the aircraft for the takeoff and landing and thrust nozzles on back off aircraft for the forward flight. All these concepts has a stationary fuselage and aircraft changes direction of thrust for transition flight. The tail sitter fixed wing aircraft that take-off and land vertically, cruise flight horizontally, developed were powered by gas turbine engines driving dual counter rotating propellers. The pitch-transitioning aircraft concepts developed that separate propulsion systems for separate flight modes. These aircraft concepts use one or more propulsion systems for high speed forward flight and carry four or more additional motors specifically for hovering flight.

The multirotor concept commonly used for the small unmanned electrically powered platforms (drones). The fixed pitch propellers driven by the electric motors mainly used these multirotor platforms. Due to limited thrust and high weight of battery and electric motors, the multirotor systems have limited pay-load capacity and they have little endurance and range. The main restriction and disadvantage of these systems is that the aircraft must always overcome to gravity with the thrust. These multirotor systems consume too much electrical power to stay in air. The multirotor systems need electric-motors to maneuver precisely. But the electric motor and battery technology is not improved yet to make lighter batteries and electric motors. Also speed of the multirotor is limited because of design factors.

The classic multirotor systems usually don't have wings to produce lift and tilting angle and forward thrust is limited by need of down-ward thrust to keep the altitude. There are some studies and patents about the multirotor systems that has a wing for the forward flight. These designs are small unmanned aircrafts that takeoff and land as multirotor and cruises as airplane using air foil shaped wings. But their fuselage is stationary relative to wings or propellers. These design limits and make harder the manned flight.

SUMMARY OF INVENTION

The main idea of this design is to keep wings, engines and propellers stationary relative to flight path while rotating aircraft's cockpit and cabin (fuselage) for modes of the flight. The X or H wing multirotor design that has airfoil shaped (wing) X or H frame multirotor design used to explain the invention. The tilting fuselage aircraft can take-off/land and fly like a X/H frame multirotor that uses propellers on wing tips to produce lift and thrust. After takeoff aircraft begin to fly, gain altitude and air speed like the other classic multirotor systems. In this design aircraft has airfoil shaped X/H wings. The aircraft propellers produce forward thrust while wing shaped wings produce the lift. When the multirotor aircraft gained enough altitude and forward airspeed, aircraft X/H frame and propellers moved downward aerodynamically to the horizontal plane while tilting the fuselage upward mechanically to keep pilots and passengers sitting relatively parallel to ground. The tilting movement of the fuselage helps to balance aircraft weight and lift during the forward flight.

The aircraft concept comprises two major parts: a winged carrier frame and a tilting fuselage. The winged carrier frame comprises X/H Wing shaped wings, engines and propellers. It can be divided into similar two parts connected with the main spar which passes through the fuselage.

Technical Problem

The design of high cruising speed vertically takeoff and landing aircraft is a difficult problem. The helicopters are vertically takeoff and landing aircraft but their large span rotors that rotates in the direction of flight limits the high speed. Also the helicopters are highly complex flying machines with the high production and maintenance costs.

The tilt rotor and the tilt wing aircraft that takeoff and land like helicopter, cruises like airplane may be a solution of this problem, but these aircraft types have very complex thrust vectoring system. The tilt rotor and the tilt wing aircraft are also highly complex flying machines with the high production and maintenance costs. There are design difficulties such as not much forward speed and safety issues because off complex thrust vectoring system.

The tail sitter type aircraft is the another solution for the high cruising speed VTOL aircraft. These type of aircraft suffers control difficulties at takeoff, landing and hover phases. Also flight crew sitting position changes on aircraft flying position that makes difficult to control aircraft. Also these type of aircraft are relatively unstable at flight.

Solution to Problem

The winged multirotor design used to achieve to high cruising speed. The aircraft takeoff and land using propellers or engine thrust like the tail sitter or the multirotor aircraft. After achieving the safe altitude the aircraft changes its flight angle to use the wings for the lift and by using the propeller or engine thrust for the forward speed.

The thrust controlling system used as a main flight control system that is less complex design than the tilt rotor and the tilt wing applications. Basically adjusting propeller or engine thrust by changing propeller pitch and/or engine power to reduce complexity of the aircraft. This advantage makes it possible to produce less complex more safe and more affordable Vertical Takeoff and Landing aircraft.

The flight crew or passenger position problem is solved using tilting fuselage design. The solution of the problem with this design is rotating the fuselage relatively to flying path to keep flight crew and passengers relatively parallel to the ground. Rotating of the fuselage also assists to keep aircraft's pitch axis stability by reducing the moment of inertia.

Advantageous Effects of Invention

The main idea of this invention that, it is easier and simpler to rotate the fuselage than engines or wings. The winged frame design allows more fuel efficient and faster aircraft. The thrust controlling type main flight control system reduces the complexity, the design and production costs and the maintenance costs. The aircraft can be manufactured in various sizes. It can be small aircraft to carry one or two people on board or at much more big sizes like the airliner airplanes. This invention has the great potential to improve the air transport industry in future. This design has a large scope of application fields that it can be used at the urban or intercontinental transportation moreover at the space transportation.

BRIEF DESCRIPTION OF DRAWINGS

The following figures prepared to use conjunction with detailed description of invention. All figures ordered according to paragraph sequence of the description. The X-Frame type multirotor illustrated as an example option for this invention but various type frame option such as H-Frame can be selected for the design purposes.

DESCRIPTION OF EMBODIMENTS

This invention is generally directed to vertical takeoff and landing (VTOL) aircraft that can takeoff, fly and land as a multirotor aircraft and flies at high speed at cruise flight as an airplane. This invention makes it possible to design less complex, affordable and safe VTOL aircraft. The aircraft comprises two major parts. First main part is the winged carrier frame that includes wings, engines, propellers and landing gears. Second main part is the tilting fuselage that includes cockpit, cabin and tail.

The winged carrier frame is basically an X/H frame multirotor aircraft that has the wing foil shaped arms (wings). The aircraft can vertically takeoff and land as a helicopter or multirotor. After the takeoff aircraft would continue to fly in this mode at low speed. At this mode thrust generated by the engine and propeller directed to the ground to overcome gravity. After gaining an altitude and forward airspeed, the aircraft changes its flying axis that wings and direction of thrust parallel to the horizon. This is the mode that the aircraft has basic airplane flying characteristics and lift generated by wings while forward thrust generated by propellers.

Figure 1:
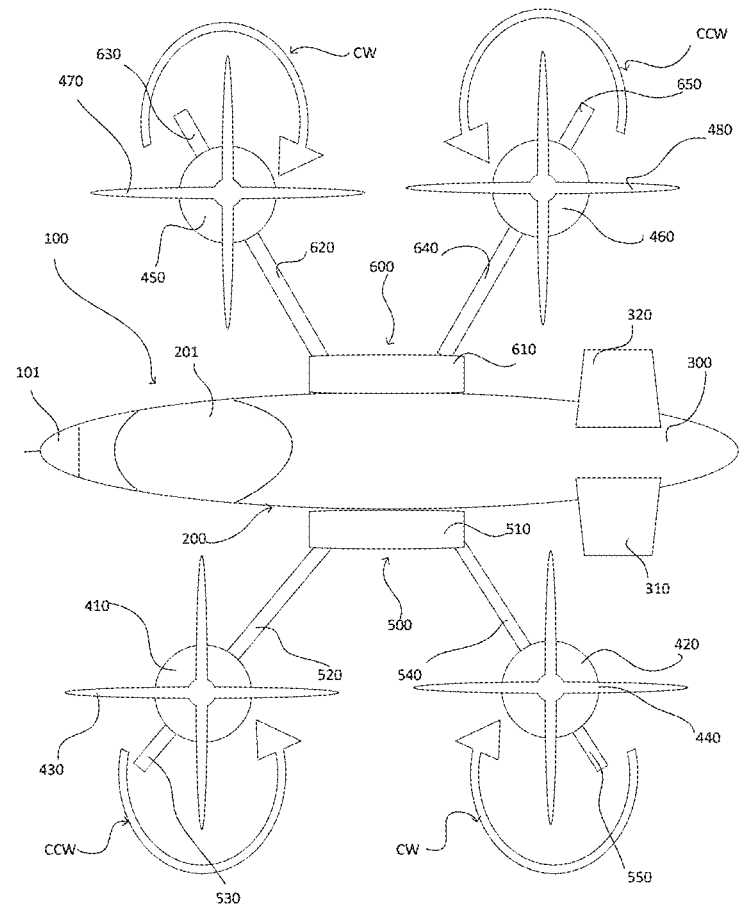
FIG. 1 is a plan view of the vertical takeoff and landing tilting fuselage winged frame multirotor aircraft at multirotor mode that is used for vertical take-off and landing phases.
Figure 2:
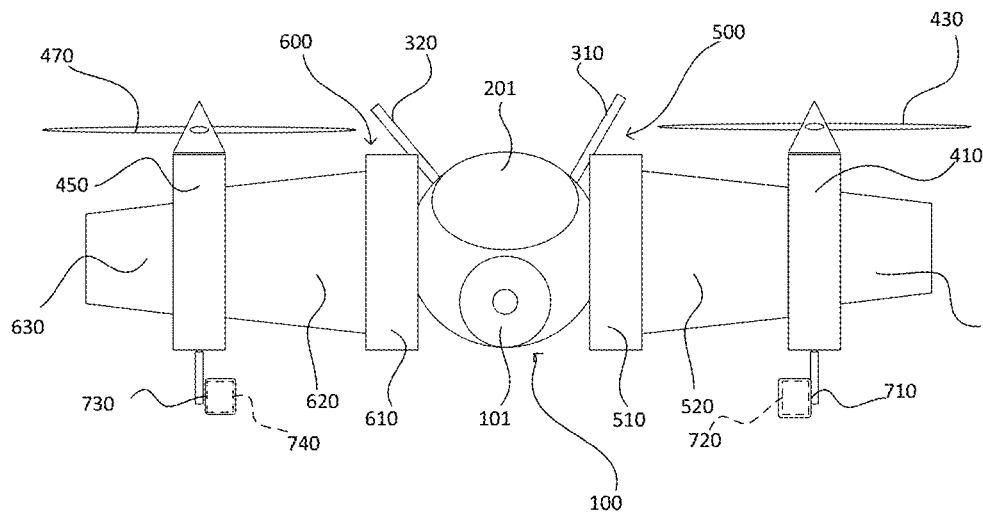
FIG. 2 is a front view of the vertical takeoff and landing tilting fuselage winged frame multirotor aircraft at multirotor mode that is used for the vertical takeoff and landing phases.
Figure 3:
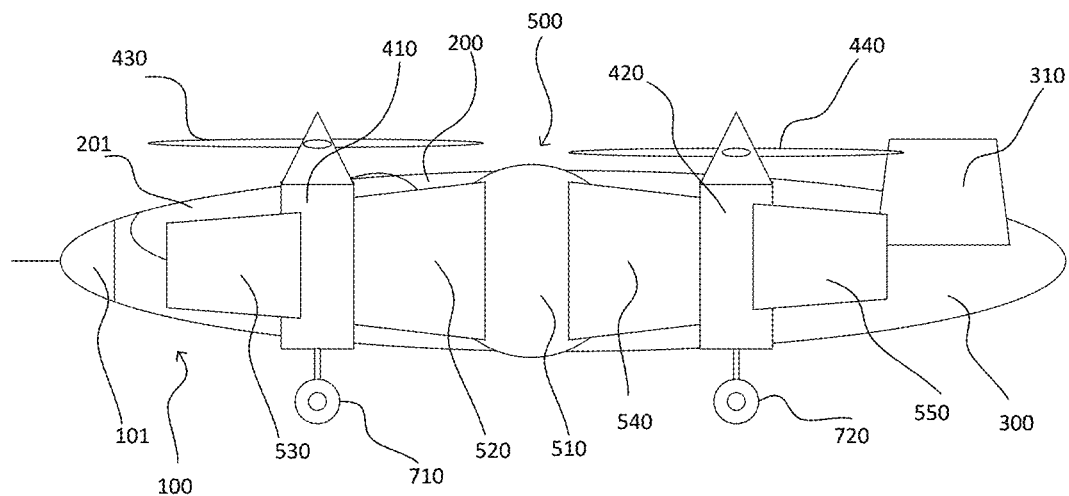
FIG. 3 is a side view of the vertical takeoff and landing tilting fuselage winged frame Multirotor Aircraft at multirotor mode that is used for vertical take-off and landing phases.
Figure 4:
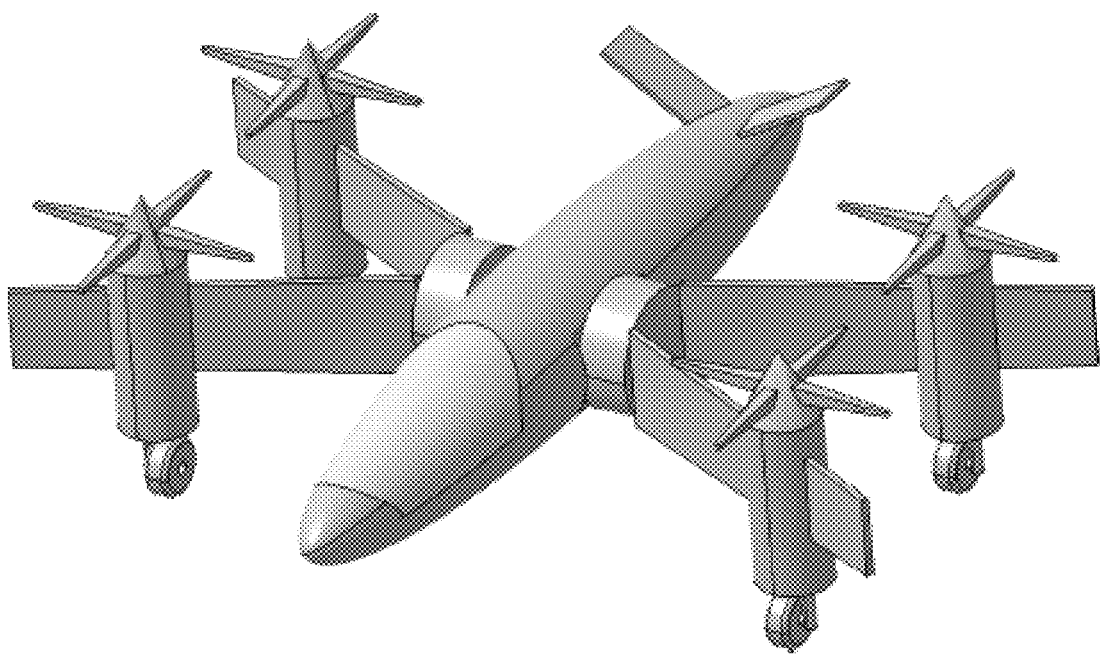
FIG. 4 is a perspective view of the vertical takeoff and landing tilting fuselage winged frame multirotor aircraft at multirotor mode that is used for the vertical takeoff and landing phases.
Figure 9:
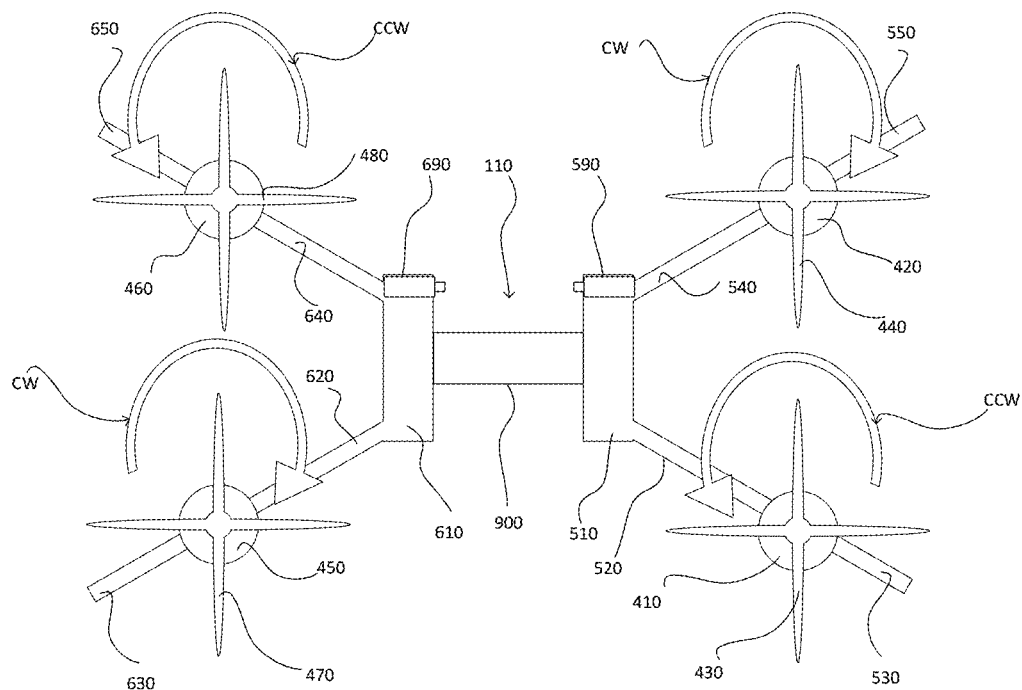
FIG. 9 is a front view of the winged carrier frame

The basic motivation on vertical takeoff and landing winged frame tilting fuselage aircraft in FIG. 1 to design non-complex affordable aircraft that has less moving parts. The main idea of this invention is that it is easier and simpler to rotate a fuselage than engines or wings. The main function of the fuselage in this invention to accommodate crew, passenger and payload. The tilting fuselage 100 comprises nose cone 101, middle fuselage 200, windshield 201, tail cone 300 and V-Tail control surfaces 310 and 320 in FIG. 1. The main flying sections of the aircraft including wings, engines, and fuel tanks and supporting bodies installed on the winged carrier frame 110 in FIG. 9. The left forward main landing gear 710, right forward main landing gear 730, left aft main landing gear 720 and right aft main landing gear 740 in FIG. 2. are installed on nacelles of the left forward engine 410, right forward engine 450, left aft engine 420 and right aft engine 460 are those first shown in FIG. 1.

As seen on FIG. 1 aircraft has four wing structure comprising left wing 500 and right wing 600. These two major parts are symmetric and identical to each other. Left 500 and right 600 wings include supporting frames 510 and 610. Main feature of these supporting frames is connecting forward and aft wings and carrying propulsion and accessories to tilt the fuselage. Left and right forward wings comprising inner 520, 620 and outer 530, 630 wings. These two wing parts are connected with the main spar 900 in FIG. 9 which is connected to the supporting frame 510 and 610. Left and right aft wings consist of inner 540, 640 and outer 550, 650 wings. These two wing parts connected with main spar which is connected to supporting frames 510 and 610. Symmetric airfoil selected to provide stability in hover or multirotor mode. Airflow generated by propellers will form equal pressure on both sides of the symmetrical airfoil thus aircraft stability is enhanced at takeoff, hover and landing phase.

The left aft engine 420 and propeller 440 and right forward engine 450 and propeller 470 rotates clockwise while the left forward engine 410 and propeller 430 and right aft engine 460 and propeller 480 rotates counter clockwise. Engine with the propeller type propulsion system chosen for effective static thrust and effective yaw control of an aircraft. The variable pitch, high span propellers are used for the takeoff at multirotor mode with the low pitch high RPM, while cruising in an airplane mode high pitch low RPM will be used. Although propeller configuration seems to be a suitable solution at the beginning point. Another propulsion solution such as turbofan, electric ducted fan or even rocket engines for spacecraft applications will be available in the future.

When an aircraft in takeoff/landing or low speed phase of the flight, it flies like standard X-frame multirotor. The aircraft flight control system adjusts the power of all four engines to steady takeoff/landing or hover to make the aircraft parallel to the ground. When forward pitch flight direction is needed the aircraft flight control system will increase the power of aft engines 420, 460 and propellers 440, 480 while decreasing or fixing power of the forward engines 410, 450 and propellers 430, 470. It will directed to vice versa for the rear pitch flight direction. The aircrafts roll movement provided by adjusting the power of left side engines 410, 420 and propellers 430, 440 or right side engines 450, 460 and propellers 470, 480. Yaw movement is provided by adjusting the power of clockwise rotating engines 420, 450 and propellers 440, 470 or counter clockwise rotating engines 410, 460 and propellers 430, 480.

Figure 10:
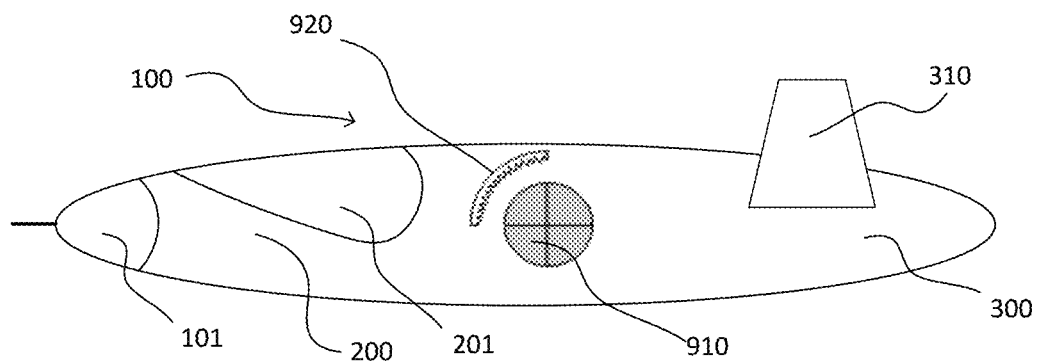
FIG. 10 is a side view of the tilting fuselage

After the takeoff an aircraft will begin to gain airspeed and altitude in multirotor mode. Following the gain safe altitude and airspeed that airfoil shaped wings can generate lift aircraft can be switched to airplane mode. The winged carrier frame 110 in FIG. 9 will switched to airplane mode by increasing the thrust of the aft engines 420, 460 and propellers 440, 480 while decreasing or fixing the thrust of the forward engines 410, 450 and propellers 430, 470. The aircraft fuselage 100 tilted 90° to keep position relatively parallel to the ground as shown at this transition mode. This tilting motion can be provided by ring gear or hydraulic/pneumatic actuator mechanism. The clutched high torque electric motors with the locking mechanism 590 and 690 in FIG. 9 located into the winged carrier frame 110 to drive the fuselage, the tilting gear 920 located on the reinforced structure of the tilting fuselage 100. The main spar 900 in FIG. 9 which is connected to supporting frame 510 and 610 passes through the fuselage supporting spar 910 in FIG. 10. The main spar 900 and the fuselage supporting spar 910 works as a big greased plain bearing that supports the whole tilting fuselage 100 is positioned in the midst of winged carrier frame 110. The large roller bearings or ball bearings can be used instead of this greased large plain bearing design.

Rotating (tilting) the fuselage for the multirotor or airplane modes also assists to keep aircraft's pitch axis stability by reducing moment of inertia. The V-tail control surfaces 310 and 320 will be used as the auxiliary or back-up system of the engine thrust controlling type primary control system. The control surfaces are installed on the tail section of the tilting fuselage to provide basic empennage control surfaces of the airplane. V-Tail design selected for simple structure. Two control surfaces 310 and 320 are rotated by electric or hydraulic servos independently from each other. These V-Tail control surfaces control the aircraft on pitch and yaw axis. Increasing angle of attack with the same amount on both surfaces lead to nose down pitch movement while decreasing angle of attack leads to nose up pitch movement. Yaw axis movement is provided by increasing one control surface's angle of attack while decreasing the other surface's angle of attack.

Three types of propulsion system suggested for this aircraft are; classic twin turboshaft engine powered propeller drive shaft system, gas turbine driven generator powered electric motor system, hydrogen fuel cell powered electric motor system.

Figure 11:
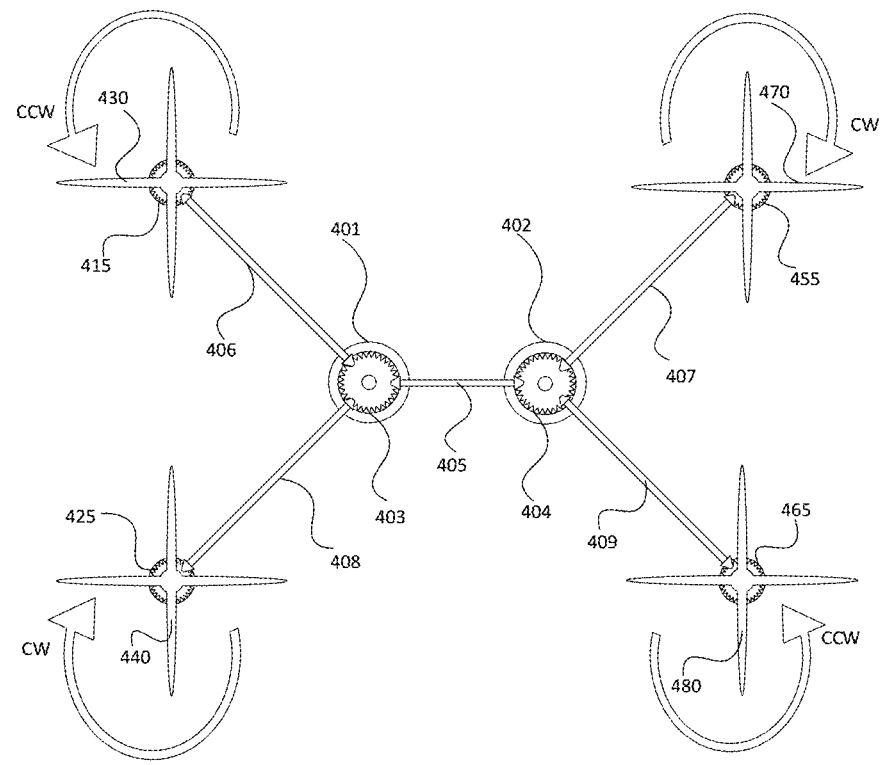
FIG. 11 is a plan view of the twin turboshaft engine propulsion system option

The twin turboshaft engine powered propulsion system is shown in FIG. 11. The gear illustrations were simply drawn and only for the reference to show the gears in the figure. This system is quite like a helicopter tail rotor drive system. Two turboshaft engines 401 and 402 in FIG. 11 installed into the supporting frames 510 and 610. The reduction gear box drive shaft of these two engines are connected to the transmission gears 403 and 404 through the freewheeling units. The transmission gears 403 and 404 in FIG. 11 are connected to each other through the power transfer shaft 405 in FIG. 11. The power transfer shaft is used for engine malfunction. When one engine is out in the flight it will disconnected from transmission gear with a freewheeling unit. The single operating engines' rotation transferred to the other side through the power transfer shaft 405 in FIG. 11 and the single engine spins both transmission gears 403 and 404. The single engine should give them enough power to keep the aircraft in the air safely.

The propellers 430, 440, 470 and 480 driven by the propeller drive gearboxes 415, 425, 455, and 465 through gearbox drive shafts 406, 407, 408, and 409 and all four propeller RPM's are equal to each other for all operation. The engine power can be adjusted between idle to full throttle. All four propeller RPM increases to the maximum RPM when the engine power is increased for the takeoff. The variable pitch of all four propellers is increased when power increases. The propeller thrusts increased with increasing pitch and propellers will give enough power for the liftoff. Increased propeller pitch at fixed RPM causes increased thrust and torque. The aircrafts' flight control is provided by changing propeller pitch. The propeller's pitch change is provided by the hydraulic or electrical systems. The electronic precise propeller governors are used for this purpose. The pitch controlling governors of the all propellers are connected to the electronic flight control system of the aircraft. The electronic flight control system changes the propeller's pitch and deflects two control surfaces 310 and 320 of the V-tail if needed. The aircraft can be easily controlled in multirotor or airplane mode by the means of adjusting propeller pitch. Increasing propeller pitch until a certain angle of attack, causes increasing thrust of the propeller.

Figure 12:
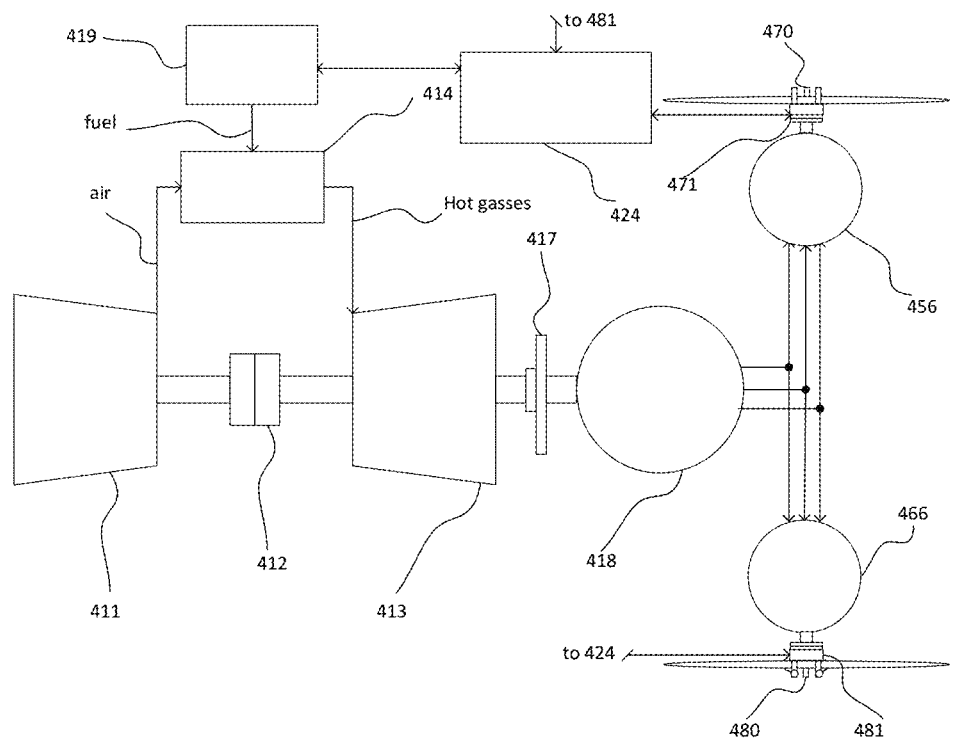
FIG. 12 is a schematic diagram of the gas turbine driven generator powered electric propulsion system option

The gas turbine driven generator powered electric motor system shown in FIG. 12. This figure shows only one part of the aircraft propulsion system and another part of the power system identical to the figure. The left and right power system, gas turbine engine output shafts connected to each other with identical power transfer shaft 405 shown in FIG. 11. This feature is necessary for safety and the same generator RPM and frequency. The power generated by the engine is converted to the electrical energy then transferred to the electric motors using electrical power cables. This power generation technique is based on converting mechanical energy and again converting electrical energy to mechanical energy. Like the any other gas turbine system air compressed in compressor 411 in FIG. 12 and sent to the combustion chamber 414. The jet fuel metered by the full authority digital engine control unit and then injected into the combustion chamber 414. The expanded hot gasses directed to turbine 413 to spin it. The single stage turbine system illustrated in FIG. 12 but a multi stage free turbine design can be used. The existing gas turbine designs may be used.

The turbine rotation coupled to the compressor 411 through coupling 412 and 3 phase synchronous generator 418 through coupling and reduction gear box 417. The reduction gear ratio will be chosen according to propellers 470, 480 RPM and 3 phase synchronous motors 456, 466 directly drive the propellers. Assuming the same number of poles used on both generator and electric motors; the generator RPM varies with the engine RPM, the generator frequency varies with the generator RPM and finally the electric motor RPM varies with the generator frequency. It can be expressed that the propeller RPM varies with the engine RPM. The 3 phase synchronous generator 418 electric power output directed to the 3 phase synchronous motors 456, 466.

The propeller thrust and RPM are controlled by the digitally controlled propeller governors 471, 481 which are controlled by the electronic flight/engine control system 424 that also monitors and controls the electronic engine control system 419. The electrical circuit control and protection system wasn't shown in the FIG. 12.

The gas turbine engine starting process is provided by a small electric starter/generator using an aircraft battery. The running engine rotates the generator 418 but the field current of the generator does not feed until the engine starts and stabilizes at idle RPM to avoid the braking torque of the generator. After the engine reached and stabilized at idle RPM, generator field current directed by the generator control unit which controls the generator output voltage. After the generator field current is provided, the generator starts to generate electrical power. The generated electric power feed to the synchronous electric motors through the electric power bus and circuit control devices (relays etc.) and circuit protection devices (current limiters etc.). These circuit control and protection devices are also used to drive other side propulsion systems during single engine operations, in case of the one engine malfunction.

The synchronous electric motor driven variable pitch propellers 470, 480 RPM's and pitches are low at the idle engine RPM. When the throttle is advanced to increase the power for takeoff at the multirotor mode, the propeller RPM's are reached the maximum designated RPM. The propeller pitch increased to increase torque at maximum RPM. The propeller torque and RPM's are monitored and controlled by the digitally controlled propeller governors 471, 481 which are controlled by the Electronic Flight/Engine Control System 424. The propeller thrusts changed by changing the propeller blade pitch that changes the propeller torque. It can be expressed that an aircraft is controlled by the changing only propeller pitch, while all propellers spins at the same rotating speed. The increased propeller torque increases the electric motor torque and load thus the generator load and torque are also increased. The amount of the metered fuel directed to combustion chamber 414 increased by the electronic engine control system 419 to compensate the increased generator torque and to keep the constant engine, generator and motor RPM's. The synchronous electric generation technique is chosen to explain this gas turbine driven electric propulsion system but other techniques, such as the induction, permanent magnet or the hybrid design may be used. Also a low speed generator drive system with reduction gearbox may be replaced with a high speed generator system. In this case, rectifying the AC current to the DC and switching of this DC current to covert AC by using a power inverter to drive the electric motors at a certain frequency for the same propeller RPM will be necessary. The details of this system will be explained in the following paragraph which explains fuel cell power system.

Figure 13:
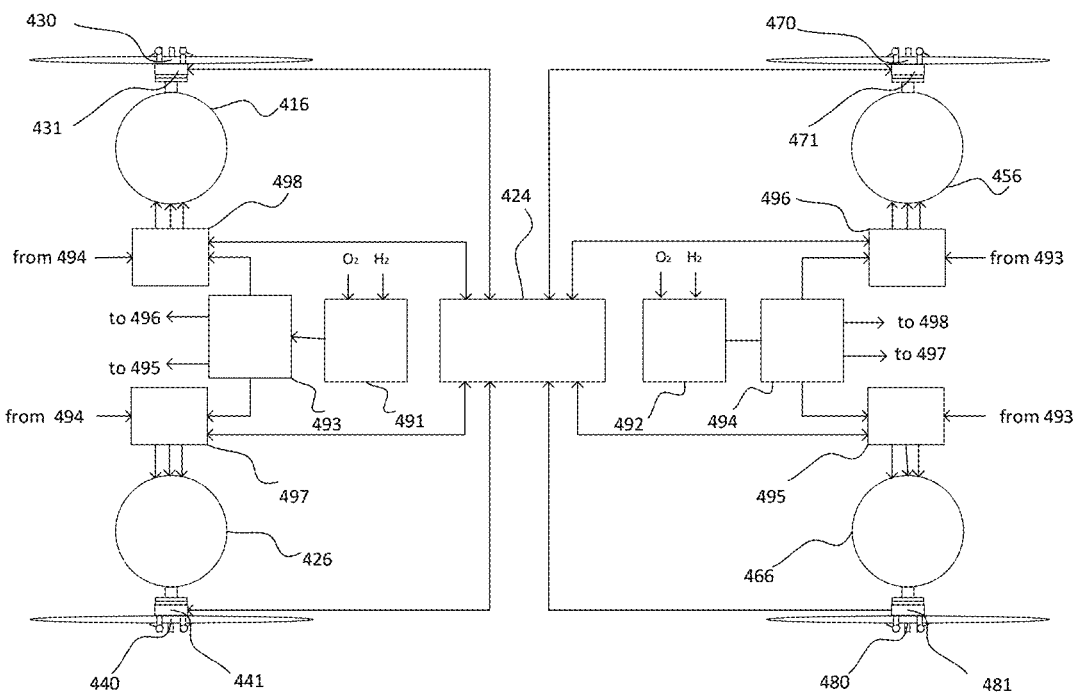
FIG. 13 is a schematic diagram of the fuel cell powered electric propulsion system option

The hydrogen fuel cell powered electric motor system shown in FIG. 13. This is the most environmentally friendly propulsion system option. The hydrogen fuel cell technology is new but there is much progress and developments implemented in this field. The successful applications existing in the automotive industry.

The hydrogen stored in the 4 (four) pressurized hydrogen cylinders that are located in the wing shaped arms of the winged carrier frame. The electricity generated by the fuel cell stacks 491, 492 in FIG. 13 used to charge the high efficiency battery packs 493, 494 that powers the electric motors 416, 426, 456, 466 through the electronic speed control systems (ESCs) 495, 496, 497, 498. All four ESCs controlled by the electronic flight/engine control system 424. The electric motors are 416, 426, 456, 466 drive the four variable pitch propellers 430, 440, 470, 480. The propeller torques and RPM's are monitored and controlled by the digitally controlled propeller governors 431, 441, 471, 481 which are controlled by the electronic flight/engine control System 424. The propeller thrusts are changed by the changing propeller RPM and the blade pitch using ESC's and the digitally controlled propeller governors. The electronic flight/engine control system 424 will be configured for multirotor and airplane modes. This propulsion system also has failsafe features that one battery stack will able to power the opposite system (cross-feeding) in case of malfunction.

The aircraft flight control system will appear to be an airplane flight control system but will work two different modes. A joystick or flight stick type control bar will work as classic helicopter cyclic control where a throttle will work as a helicopter collective and a throttle control. After the reaching safe altitude and enough airspeed that the wings can generate the lift an aircraft will be switched to airplane mode by the pilot in command. The electronic flight/engine control system 424 in FIGS. 12 and 13 will execute this complex maneuver only if safe conditions are met. The switching to the multirotor mode from the airplane mode for the landing will also be executed in the same manner.

Figure 5:
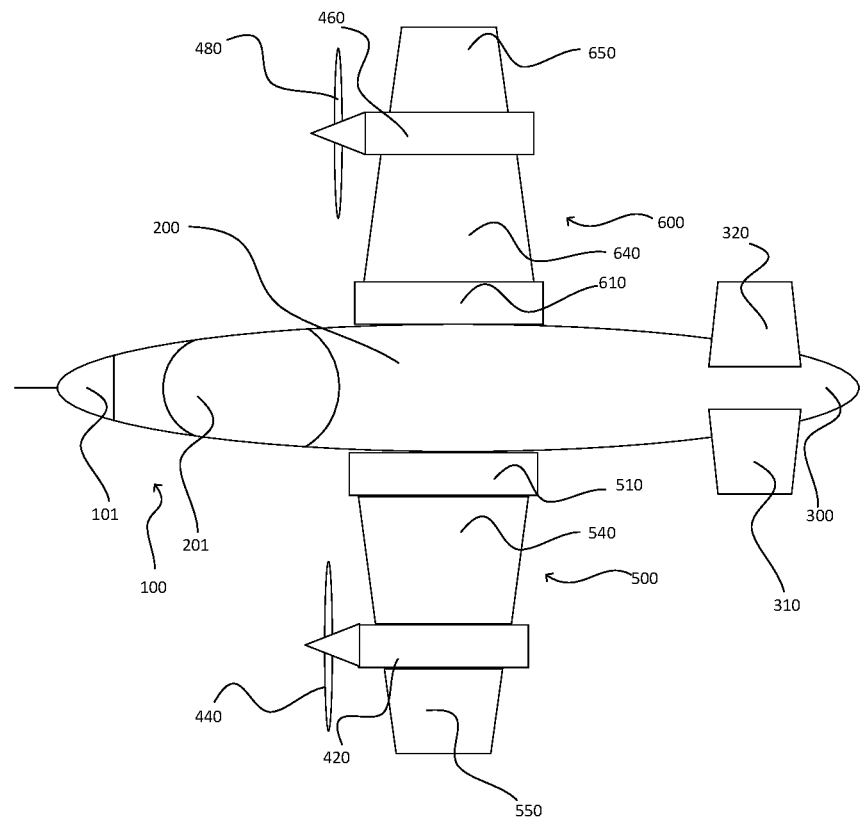
FIG. 5 is a plan view of the vertical takeoff and landing tilting fuselage winged frame multirotor aircraft at airplane mode that is used for the high speed forward flight phase.
Figure 6:
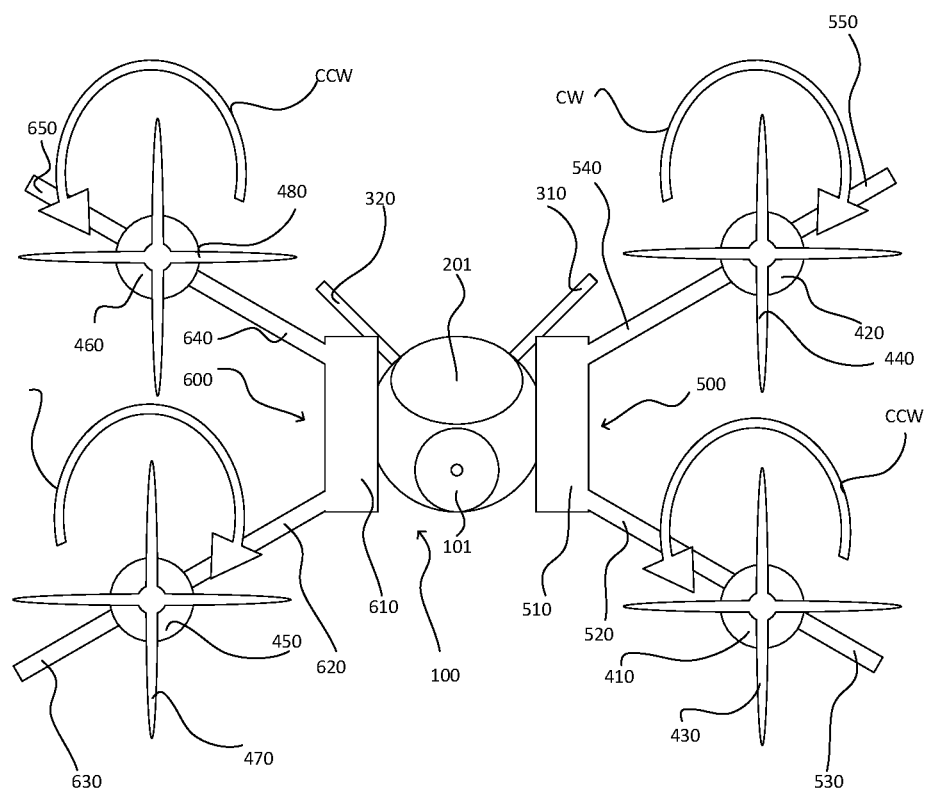
FIG. 6 is a front view of the vertical takeoff and landing tilting fuselage winged frame multirotor aircraft at the airplane mode that is used for the high speed forward flight phase.
Figure 7:
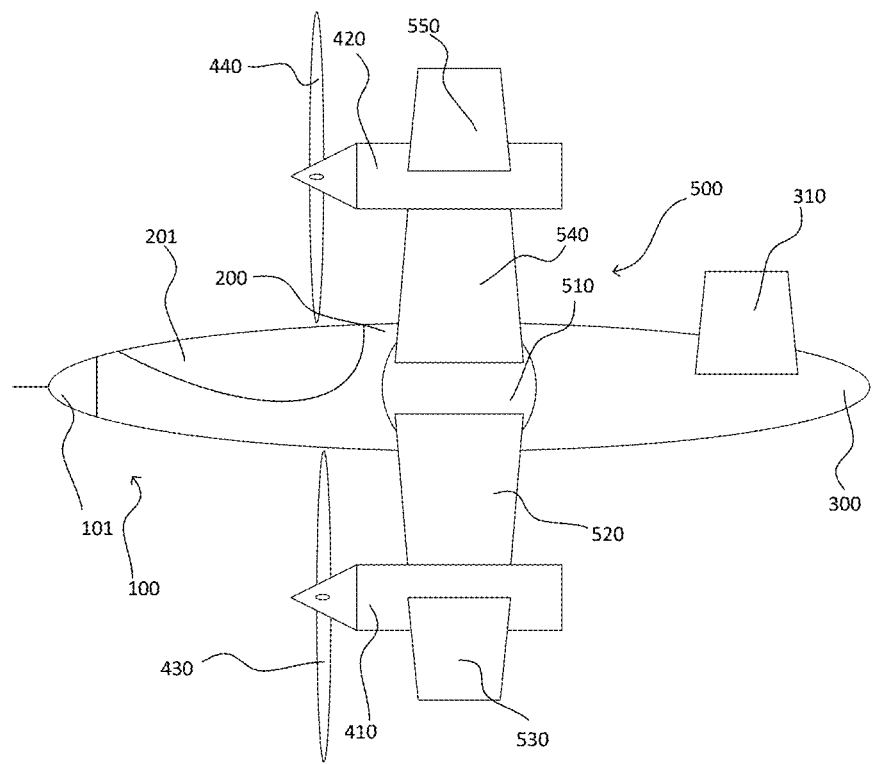
FIG. 7 is a side view of the vertical takeoff and landing tilting fuselage winged frame multirotor aircraft at the airplane mode that is used for the high speed forward flight phase.
Figure 8:
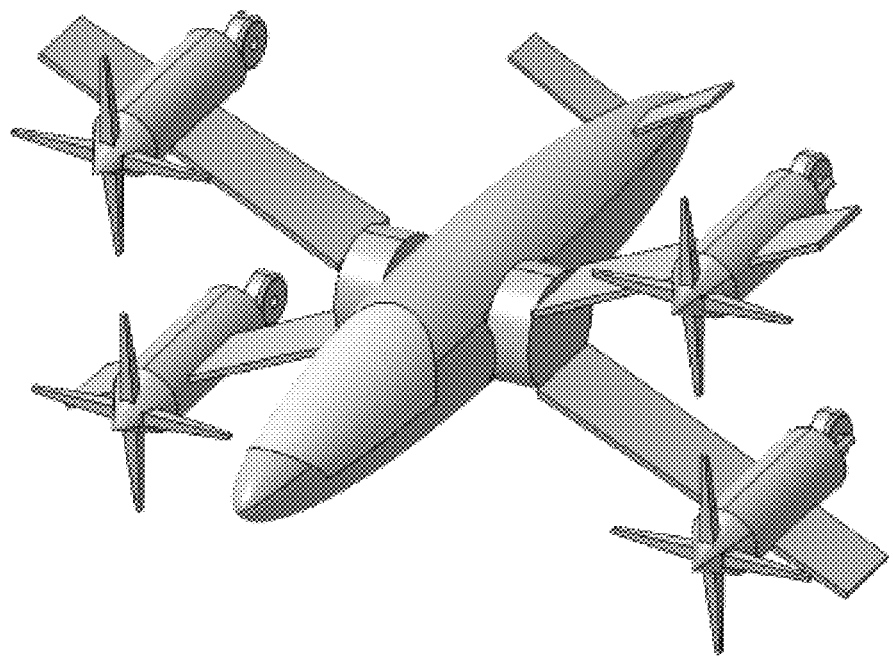
FIG. 8 is a perspective view of the vertical takeoff and landing tilting fuselage winged frame multirotor aircraft at the airplane mode that is used for the high speed forward flight phase.
Figure 14:
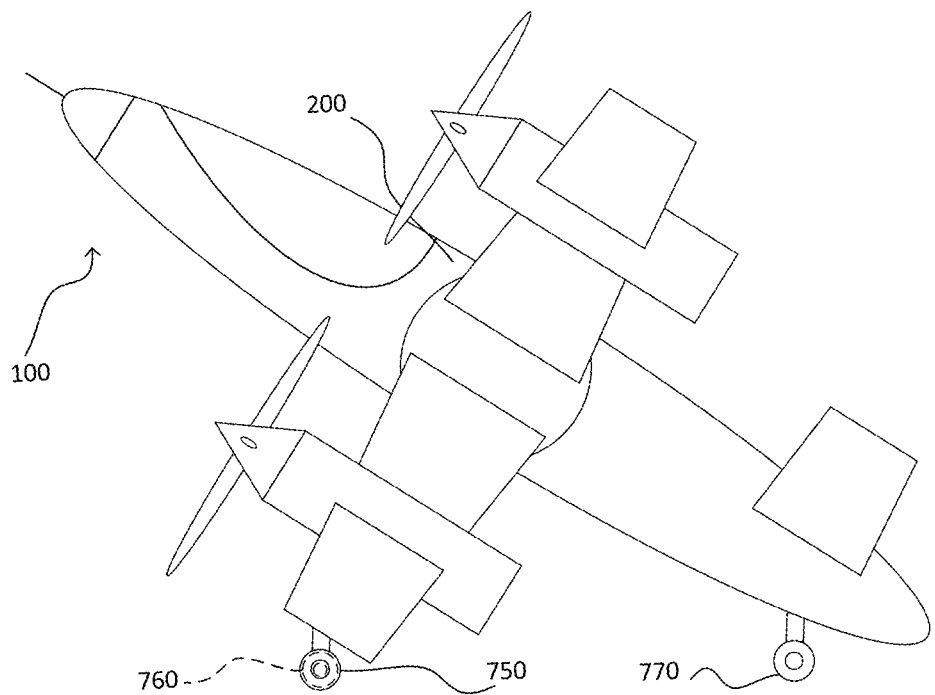
FIG. 14 is a side view of the vertical takeoff and landing tilting fuselage winged frame multirotor aircraft at airplane configuration after the emergency landing on the runway.

The aircraft safety is very important that there must be additional features added to design to improve the safety, such as additional propellers or engines to land aircraft safely in case of the engine or propeller malfunctions. It provided that there are two major hazards that threaten the safety. The first one is the engine malfunction, the one second is the fuselage tilting system malfunction in the airplane mode. There are three small landing gears installed to downward wingtips 750, 760 and tail section 770 shown in FIG. 14. These small landing gears can be used during failures on the engine or fuselage tilting mechanism. In case of the abnormal conditions an aircraft stay in the airplane configuration and land on suitable runway while first touching the wingtip landing gears first and the tail landing gear after slowing down like the tail wheel equipped airplane. The landing gears are installed on the wing spars and tail section bulkheads that they are reinforced to carry landing loads. The control surfaces 310 and 320 on the tail section 300 shown in FIG. 5 will work as the main flight control system in case of the total or extensive engine failure.

The propulsion system can receive the power from the engines using the power transfer shaft or the electric motors receive the electric power from the engine driven generator or from the fuel cells.

The engine propulsion system or thruster can be a propeller or ducted fan or prop-fan.

The tilting mechanism used to tilt the fuselage can be a electro mechanic or hydraulic or pneumatic systems.

The electro-chemical electricity generating system is any type of the fuel cell that generates the electricity directly from the electro-chemical reaction process that is combining stored hydrogen or hydrogen rich fuel with the oxygen or air.

The battery packs used to power electric motors through the electronic speed controllers can be chemical batteries or super/ultra capacitors.

PATENT LITERATURE

PTL1: US2018/354615 A1
PTL2: US 2016/0144957 A1
PTL3: WO 2017/200610 A1
PTL3: WO 91/11363, US005115996 A
PTL4: WO 2016/109003 A2
PTL5: US2003/0230671 A1
PTL6: US2015/0329204 A1
PTL7: U.S. D471,247 S
PTL8: US 2016/0311528 A1
PTL9: US 2017/0158325 A1
PTL10: WO/2019/036011
PTL11: US20190031331 A1
PTL12: US20190031334 A1
PTL 13: US20190031335 A1
PTL 14: US20190031338 A1
PTL 15: US 2018/002011 A1

Non Patent Literature

NPL1: Cutler, Mark and How, Jonathan P. "Analysis and Control of a Variable-Pitch Quadrotor for Agile Flight." Journal of Dynamic Systems, Measurement, and Control 137, no. 10 (July 2015):101002. © 2015 American Society of Mechanical Engineers http://dx.doi.org/10.1115/1.4030676

NPL2: Richard B. Bramlette and Ronald M. Barrett. "Design and Flight Testing of a Convertible Quadcopter for Maximum Flight Speed" 55th AIAA Aerospace Sciences Meeting, AIAA SciTech Forum, (AIAA 2017-0243) Grapevine, Texas January 2017

NPL3: Mark Johnson Cutler. "Design and Control of an Autonomous Variable-Pitch Quadrotor Helicopter" Master of Science in Aeronautics and Astronautics Massachusetts Institute of Technology 2012.

NPL4: Shouzhao Sheng* and Chenwu Sun. "Control and Optimization of a Variable-Pitch Quadrotor with Minimum Power Consumption" Energies 2016, 9, 232; doi:10.3390/en9040232 www.mdpi.com/journal/energies

The invention claimed is:

1. A vertical takeoff and landing multirotor aircraft comprising; a winged carrier frame that comprises a wing shaped left and right arms connected to left and right supporting frames that connected together by a main spar, said left and right wing shaped arms are symmetrical comprising forward and aft wing shaped arms, each said wing shaped arms has propulsion system housings and supporting nacelles;

a tilting fuselage having a cockpit, cabin and tail sections, that accommodates payload and tilted 90° when said winged carrier frame switched to airplane mode or multirotor mode to keep position of the fuselage relatively parallel to the ground in both two flight modes;

wherein said supporting nacelles also include landing gears;

wherein said winged carrier frame and said tilting fuselage having semi monocoque multi-wing structure;

wherein said main spar passes through fuselage and also supports the fuselage;

wherein tilting motion of the said tilting fuselage provided by tilting mechanism.

2. The vertical takeoff and landing multirotor aircraft recited claim 1 wherein said winged carrier frame having semi monocoque multirotor structure comprising wing shaped left and right arms having supporting frames that connecting forward and aft wing shaped arms and carrying propulsion systems, landing gears and fuselage tilting accessories; left forward, right forward, left aft and right aft wing shaped arms comprising inner and outer wing shaped arms connected by spars which are connected to the supporting frames.

3. The vertical takeoff and landing multirotor aircraft recited claim 1 wherein said winged carrier frame's wing shaped arms having symmetrical airfoil cross-section to enhance aircraft stability during takeoff, hover and landing phases.

4. The vertical takeoff and landing multirotor aircraft recited claim 1 said winged carrier frame comprises main flying sections of the aircraft, wherein wings, propulsion systems, fuel tanks, supporting bodies and a primary flight control system components included in said winged carrier frame.

5. The vertical takeoff and landing aircraft recited in claim 1 said winged carrier frame comprising left aft/forward propulsion system and right aft/forward propulsion system wherein left aft and right forward propulsion system rotates one direction while left forward and right aft propulsion system rotates counter direction.

6. The vertical takeoff and landing aircraft recited in claim 1 said primary flight control system is a propulsion thrust controlling type system, wherein aircraft propulsion thrust adjusted to flight control for multirotor or airplane modes, aircraft primary flight control motion provided by differential thrusts of propulsion system.

7. The vertical takeoff and landing aircraft recited in claim 1 said tilting fuselage is crew and payload carrying structure for the multirotor or airplane modes, wherein said tilting fuselage also assists to keep aircraft pitch axis stability by reducing moment of inertia and tail control surfaces will be used as auxiliary or back-up system of thrust differential type primary flight control system in normal mode while they will have used as a primary control system in emergency conditions.

8. The vertical takeoff and landing aircraft recited in claim 1 further comprises a aircraft flight control system works in two different modes, a flight control bar will work as classic helicopter cyclic control where a throttle will work as helicopter collective and throttle control, rudder pedals used for yaw control when aircraft switched to multirotor mode; said flight control bar will work as classic airplane control wheel or stick where said throttle used for controlling thrust and rudder pedals used for yaw control when aircraft switched to airplane mode wherein said aircraft flight control system will be switched to airplane mode or multirotor mode using electronic flight/engine control system and aircraft flight control system changes the thrusts in primary mode and deflects V tail control surfaces in secondary mode.

9. The vertical takeoff and landing aircraft recited in claim 1 further comprises an emergency landing system used for emergency landing during abnormal conditions, wherein three small landing gears installed to downward wing tip areas and tail section area; said three small landing gears can be used during failures on engine or fuselage tilting mechanism; in case of abnormal conditions aircraft locked in airplane configuration and land on suitable runway, touching wing tip area landing gears first and tail area landing gear after slowing down; and said V tail control surfaces will work as main flight control system in case of total or extensive engine failure.

10. The vertical takeoff and landing aircraft recited in claim 1 further comprises at most one of the following propulsion systems; a gas turbine engine with drive shaft mechanism, the gas turbine engine driven generator powered electric motor system, the electro-chemical electricity generating pack powered electric motor system; wherein all propellers are variable pitch type; propeller thrusts changed by changing propeller pitch to provide primary control features and two power generating system allowing single power generating system operation to increase the redundancy and safety.

\* \* \* \* \*